United States Patent [19]

Primeaux

[11] Patent Number: 5,118,728
[45] Date of Patent: Jun. 2, 1992

[54] SPRAY POLYUREA ELASTOMERS USING CHOPPED GLASS ROVING

[75] Inventor: Dudley J. Primeaux, Elgin, Tex.

[73] Assignee: Texaco Chemical Company, White Plains, N.Y.

[21] Appl. No.: 261,193

[22] Filed: Oct. 24, 1988

[51] Int. Cl.$^5$ .................. C08K 3/40; C08L 75/02; C08G 18/32; C08G 18/50

[52] U.S. Cl. .................. 523/315; 524/847; 524/871; 524/872; 524/875; 528/57; 528/58; 528/60; 528/61; 528/76; 528/77

[58] Field of Search ............. 523/315; 524/874, 875, 524/872, 847, 871, 494, 589, 590; 528/57, 60, 61, 76, 77

[56] References Cited

U.S. PATENT DOCUMENTS

| | | | |
|---|---|---|---|
| 3,666,788 | 5/1972 | Rowton | 260/465.5 R |
| 3,714,127 | 1/1973 | Fabris et al. | 260/77.5 AM |
| 3,714,128 | 1/1973 | Rowton et al. | 260/77.5 CH |
| 3,979,364 | 9/1976 | Rowton | 260/77.5 AM |
| 3,984,360 | 10/1976 | Gallbreath et al. | 260/2.5 AQ |
| 4,396,729 | 8/1983 | Dominguez | 521/51 |
| 4,433,067 | 2/1984 | Rice et al. | 521/51 |
| 4,444,910 | 4/1984 | Rice et al. | 521/51 |
| 4,474,900 | 10/1984 | Dominguez | 521/110 |
| 4,582,887 | 4/1986 | Dominquez | 524/494 |
| 4,585,850 | 4/1986 | Dominguez | 528/122 |
| 4,607,090 | 8/1986 | Dominguez | 528/48 |
| 4,748,192 | 2/1988 | Smith | 521/107 |
| 4,748,201 | 5/1988 | Smith | 524/712 |
| 4,806,615 | 2/1989 | Rice et al. | 528/77 |

Primary Examiner—Thurman K. Page
Assistant Examiner—Edward J. Webman
Attorney, Agent, or Firm—Jack H. Park; Kenneth R. Priem

[57] ABSTRACT

A spray polyurea elastomer is made in combination with a filler material by spraying together two reactive elastomers and dispensing filler material into the spray pattern.

4 Claims, No Drawings

SPRAY POLYUREA ELASTOMERS USING CHOPPED GLASS ROVING

BACKGROUND OF THE INVENTION

1. Field of the Invention

This invention concerns the field of spray elastomers.

2. Description of Related Publications

U.S. Pat. No. 3,979,364 uses aminated polyethers as hereinafter used as a component with a polyol to make an elastomer. U.S. Pat. No. 3,666,788 describes the use of cyanoalkylated aminated polyethers in spray systems. The '788 disclosure in Column 1 states that the aminated polyethers as used hereinafter cannot be used in spray coatings due to very rapid reaction rates with isocyanates.

U.S. Pat. Nos. 4,396,729; 4,444,910 and 4,433,067 concern elastomers prepared using a high molecular weight amine terminated polyether, an aromatic diamine chain extender and an aromatic polyisocyanate which may merely be a polyisocyanate or a quasi-prepolymer prepared from a polyol reacted with a polyisocyanate wherein some isocyanate groups are still left unreacted. Various patents have been applied for and received using the basic combination recited above as well as various mold release agents and other additives, for example catalysts and fillers, including glass fibers. For example, see U.S. Pat. No. 4,607,090.

U.S. Pat. No. 4,585,850 concerns and claims a reaction injection molded elastomer made by reacting in a closed mold amine terminated polyether of greater than 1500 average molecular weight, having greater than 50% of their active hydrogens in the form of amine hydrogens, a chain extender, flaked glass pretreated with amino silane coupling agent, and an aromatic polyisocyanate. The '850 patent referred to above contains a discussion of other applications and patents in the field; for example, U.S. Pat. No. 4,474,900 and U.S. Pat. No. 4,507,090, and is incorporated herein by reference.

The paper "Silane Effects and Machine Processing in reinforced High Modulus RIM urethane Composites," by E. G. Schwartz, et al., *Journal of Elastomers and Plastics,* vol. 11 (Oct. 1979), page 280, describes the use of silane treated milled glass fibers in reinforced RIM composites.

The article "Surface Modification for RRIM Urethanes," by Ed Galli, *Plastics Compounding (January/February* 1982) discloses silane treated glass fiber reinforcement of RRIM urethanes.

RELATED APPLICATION

Copending application Ser. No. 07/039,035, filed Apr. 16, 1987, abandoned discloses polyurea spray systems to coat strands and/or wires.

SUMMARY OF THE INVENTION

The invention is a method for making a spray polyurea elastomer in combination with a filler material comprising spraying together two reactive streams and dispensing filler material into the spray pattern wherein one of the two reactive streams comprises an aromatic polyisocyanate and the other reactive stream comprises amine terminated polyethers of greater than 1500 molecular weight, having greater than 50% of their active hydrogens in the form of amine hydrogens, and a chain extender. The invention is also the resulting spray elastomer.

DESCRIPTION OF THE PREFERRED EMBODIMENTS

Amine terminated polyethers including primary and secondary amine terminated polyether polyols of greater than 1500 average molecular weight having from 2 to 6 functionality, preferably from 2 to 3, and an amine equivalent weight from about 750 to about 4000 are useful in this invention. Mixtures of amine terminated polyethers may be used. The specific amine terminated polyether chosen depends on the desired properties of the elastomer. These materials may be made by various methods known in the art.

The amine terminated polyether resins useful in this invention, for example, are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50 per cent of their active hydrogen in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by prior art techniques, for example, as outlined in U.S. Pat. No. 3,654,370, incorporated herein by reference.

In the practice of this invention, a single high molecular weight amine terminated polyether resin may be used. Also, mixtures of high molecular weight amine terminated polyols such as mixtures of di- and trifunctional materials and/or different molecular weight or different chemical composition materials may be used.

The chain extenders useful in this invention include, for example, 1-methyl-3,5-diethyl-2,4-diaminobenzene, 1-methyl-3,5 diethyl-2,6-diaminobenzene (both of these materials are also called diethyltoluene diamine or DETDA), 1,3,5-triethyl-2,6-diaminobenzene, 3,5,3',5'-tetraethyl-4,4'-diaminodiphenylmethane and the like. Particularly preferred aromatic diamine chain extenders are 1-methyl-3,5-diethyl-2,4-diaminobenzene or a mixture of this compound with 1-methyl-3,5-diethyl-2,6-diaminobenzene. It is within the scope of this invention to include some aliphatic chain extender materials as described in U.S. Pat. Nos. 4,246,363 and 4,269,945.

Other chain extenders which find use in the method of this invention are low molecular weight polyoxyalkylene polyamines which contain terminal amine groups and are represented by the formula

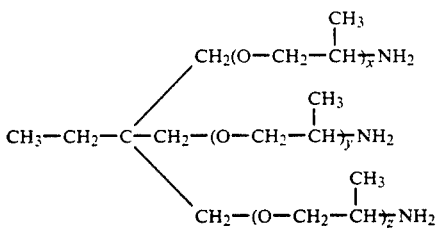

wherein $x+y+z$ has a value of about 5.3. The average amine hydrogen equivalent weight is about 67 and the product is commercially available from Texaco Chemical Company as JEFFAMINE® T-403. Another related polyoxypropylene polyamine is represented by the formula

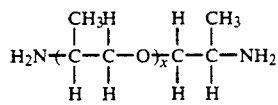

wherein x has a value of about 5.6. This product has an average amine hydrogen equivalent weight of about 100 and is commercially available from Texaco Chemical Company as JEFFAMINE D-400. The product having the same formula as above wherein x has an average value of about 2.6 is also useful. This product has an average amine hydrogen equivalent weight of about 57.5 and is commercially available from Texaco Chemical Company as JEFFAMINE D-230.

Other chain extenders will be apparent to those skilled in the art and the above recitation is not intended to be a limitation on the invention claimed herein.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolyene diisocyanate, naphthalene-1,4-diisocyanate, bis(4-isocyanatophenyl)methane, bis(3-methyl-3-isocyanatophenyl)methane, bis(3-methyl-4isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molucular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979.

By far the most preferred aromatic polyisocyanate is methylene bis(4-phenylisocyanate) or MDI. Pure MDI, quasi-prepolymers of MDI, modified pure MDI, etc. are useful. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally, uretonimine modified pure MDI is included also. This product is made by heating pure distilled MDI in the presence of a catalyst. The liquid product is a mixture of pure MDI and modified MDI:

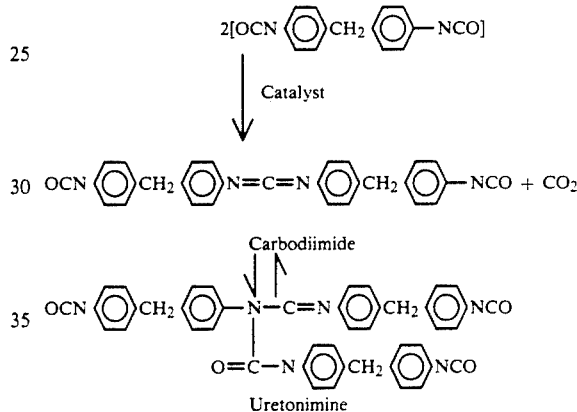

Examples of commercial materials of this type are Dow's ISONATE® 125M (pure MDI) and ISONATE 143L ("liquid" MDI). Preferably the amount of isocyanates used is the stoichimetric amount based on all the ingredients in the formulation or greater than the stoichimetric amount.

Of course, the term polyisocyanate also includes quasi-prepolymers of polyisocyanates with active hydrogen containing materials.

If needed, the following catalysts are useful although the reactants will normally not require a catalyst. Catalysts such as tertiary amines or an organic tin compound or other polyurethane catalysts are used. The organic tin compound may suitably be a stannous or stannic compound such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g., trimethylamine, triethylamine); heterocyclic amines, such as N-alkylmorpholines (e.g., N-methylmorpholine, N-ethylmorpholine, dimethyldiaminodiethylether, etc.), 1,4-dimethylpiperazine, triethylenediamine, etc.;

and aliphatic polyamines such as N,N,N'N'-tetramethyl-1,3-butanediamine.

Other conventional formulation ingredients may be employed as needed such as; for example, foam stabilizers, also known as silicone oils or emulsifiers. The foam stabilizers may be an organic silane or siloxane. For example, compounds may be use having the formula:

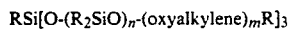

$RSi[O\text{-}(R_2SiO)_n\text{-}(oxyalkylene)_mR]_3$ wherein R is an alkyl group containing from 1 to 4 carbon atoms; n is an integer of from 4 to 8; m is a integer of from 20 to 40; and the oxyalkylene groups are derived from propylene oxide and ethylene oxide. See, for example, U.S. Pat. No. 3,194,773. The materials coated by the process of this invention include, for example, strands of materials such as wire, glass, fibers, rods, etc.

By the method of this invention, it has been discovered that filler material such as chopped glass, polyester roving, nylon roving, cotton roving (cellulose materials) Rayon ® (cellulose acetate), ceramic roving, graphite roving, Dacron ® (polyethyleneterphthalate), NOMEX ® [poly(m-phenylene isophthalate)], KEVLAR ® [poly(p-phenylene terphthalate)] for example, may be introduced into a two-component polyurea elastomer system by dispensing the filler material into the spray pattern of the polyurea elastomer. The process may be carried out, for example, with a two-component spray system wherein one component comprises the amine terminated polyether of greater than 1500 molecular weight having greater than 50% of their active hydrogens in the form of amine hydrogens and a chain extender, and the other component comprising an aromatic polyisocyanate which, of course, may be a quasi-prepolymer. When the two components are sprayed together and the filler material is introduced into the spray pattern as described in the examples to follow the reaction is so rapid that the resulting filler containing elastomer cures quickly.

In a specific embodiment of my invention a device for dispensing chopped glass would be attached to the spray gun which brings the two streams described above together so as to dispense chopped glass into the spray pattern. This chopped glass may be of any length for example ¼" to about 1¼" are typical. This glass material would improve many of the properties of the elastomer system including thermal properties and toughness. The fast reactivity of the polyurea elastomer system, coupled with the chopped glass, would provide a more efficient way to prepare many items such as bathtubs, shower stalls, small automotive parts, molds, etc., where fiber glass resins, epoxies, and polyester systems are presently being used.

Also due to the fast reactivity and rapid cure rate of the polyurea elastomers, molds can be prepared quickly and easily that have the required toughness using the chopped glass or similar filler material. These molds may be prepared more easily than the present method of using fiber glass resins, epoxies, etc., which require long processing times and long cure times.

The following examples illustrate my invention but are not intended to limit it.

EXAMPLES

A spray applied polyurea elastomer system, prepared from the mixing of an A-component and a B-component in high pressure spray equipment, can be used in combination with an externally mounted glass chopper which dispenses chopped fiberglass roving into the spray pattern of the polyurea elastomer. The fiberglass roving could be chopped in lengths of ¼" to 1¼", and would be dispensed into the spray polyurea elastomer pattern before contact with the substrate. The A-component, a quasi-prepolymer of an isocyanate and a high molecular weight polyol, is mixed with the B-component, a blend of an amine terminated polyoxyalkylene diol and/or triol and an amine terminated chain extender, to give the polyurea elastomer. The spray polyurea elastomer with the chopped glass could then be used for spraying into open molds for the production of parts, such as automotive parts, bath tubs, shower stalls, boat hulls, etc. where fiberglass resins, epoxies and polyester systems are being used. These systems, spray polyurea elastomers plus the externally added chopped glass, could also be used for the fabrication of molds. The big advantages of the spray polyurea elastomers with the chopped glass would be speed and flexibility in process, good mold surface qualities and good physical properties.

EXAMPLE 1

The first reduction into practice used a system with the A-component, a prepolymer of ISONATE 143L, 60 parts; THANOL SF-5505, 40 parts; and a B-component, a blend of JEFFAMINE D-4000, 44.9 parts; JEFFAMINE T-3000, 11.7 parts; JEFFAMINE D-2000, 10.4 parts; diethyltoluenediamine, 10.0 parts; N,N'-bis(t-butyl)ethylenediamine, 23.0 parts.

The components were mixed 1:1 by volume (1.125 A:B weight ratio) with high pressure spray equipment to produce a polyurea elastomer. A Venus glass chopper was adapted to the Gusmer GX-7 spray gun and dispensed 1¼" chopped glass roving into the polyurea elastomer spray pattern. The glass chopper is adjustable to give variable chopped glass output. The system worked extremely well with good green strength. The polyurea elastomer did not "wet out" the glass as much as anticipated due to the fast system reactivity, 1.8 sec. gel, but did work well. The physical properties of the straight spray polyurea elastomer and the glass containing polyurea elastomer can be found in Table 1. It can be noted in Table 1 the effect of the chopped glass in the polyurea elastomer on the flexural modulus and thermal properties (heat sag).

TABLE 1

|  | A | B | C |
| --- | --- | --- | --- |
| % glass | 0 | 3.95 | 2.19 |
| Tensile, psi | 1736 | 1921 | 1557 |
| Elongation, % | 154 | 5 | 15 |
| Tear, pli | 452 | 574 | 489 |
| Shore D hardness 0 sec. | 60 | 55 | 48 |
| 10 sec. | 51 | 51 | 45 |
| Flexural modulus, psi |  |  |  |
| 77° F. | 40936 | 67151 | 48234 |
| 158° F. | 30775 | 45515 | 39024 |
| −20° F. | 86653 | 115787 | 88256 |
| Impact, notched, ft.-lbs/in. | 7.83 | 7.06 | 7.53 |
| Heat sag, mm |  |  |  |
| 100 mm-250° F./60 min. | 2.1 | 0 | 1.0 |
| 150 mm-250° F./60 min. | 4.6 | 1 | 4.3 |
| 100 mm-311° F./60 min. | 14.0 | 5.0 | 14.0 |
| 150 mm-311° F./60 min. | 60.0 | 28.0 | 30.0 |

EXAMPLE 2

Another example used a system with the A-component, a quasi-prepolymer of Isonate 143L, 60 parts; THANOL SF-5505, 40 parts; and the B-component, a blend of JEFFAMINE D-4000, 63.2 parts; Ethacure 300, 15.2 parts; diethyltoluenediamine, 21.6 parts; were mixed 1:1 by volume (1.113 A:B weight ratio) with high pressure spray equipment. This system was also processed using the Venus glass chopper and worked well giving better "wetting out" of the glass due to a slower reactivity, 2.0 sec. gel time. The physical property results of this elastomer system can be found in Table 2.

TABLE 2

|  | A | B |
| --- | --- | --- |
| % glass | 0 | 3.4 |
| Tensile, psi | 1976 | 1757 |
| Elongation, % | 190 | 5 |
| Tear, pli | 459 | 483 |
| Shore D hardness, 0 sec. | 56 | 54 |
| 10 sec. | 49 | 49 |
| Flexural Modulus, psi |  |  |
| 77° F. | 35142 | 94548 |
| 158° F. | 24772 | 73089 |
| −20° F. | 91988 | 123480 |
| Impact, notched, ft-lbs/in | 6.92 | 6.12 |
| Heat sag. mm |  |  |
| 100 mm–250° F./60 min | 11.1 | 0.6 |
| 150 mm–250° F./60 min | 20.4 | 1.4 |
| 100 mm–311° F./60 min | 38.0 | 1.5 |
| 150 mm–311° F./60 min | complete sag (>75 mm) | 17.0 |

EXAMPLE 3

Another example used a system with the A-component, a quasi-prepolymer of Isonate 143L, 60 parts; THANOL SF-5505, 40 parts; and the B-component, a blend of JEFFAMINE D-4000, 48.8 parts; JEFFAMINE T-3000, 18.3 parts; diethyltoluenediamine, 17.1 parts; N,N'-bis(t-butyl)ethylenediamine, 15.8 parts; were mixed 1:1 by volume (1.123 A:B weight ratio) with high pressure spray equipment. This system was also processed as before with the Venus glass chopper and gave an elastomer with a 2.0 sec gel time. The physical property results of this elastomer system can be found in Table 3.

TABLE 3

|  | A | B |
| --- | --- | --- |
| % Glass | 0 | 5.68 |
| Tensile, psi | 1151 | 1676 |
| Elongation, % | 53 | 30 |
| 30 Tear, pli | 192 | 211 |
| Shore D hardness 0 sec. | 52 | 46 |
| 10 sec. | 39 | 38 |
| Flexural modulus, psi |  |  |
| 77° F. | 33056 | 62705 |
| 158° F. | 19647 | 41463 |
| −20° F. | 96416 | 110641 |
| Impact, notched, ft-lbs/in | 6.05 | 6.12 |
| Heat sag, mm 100 mm–250° F./60 min | 21.4 | 0.4 |
| 150 mm–250° F./60 min | 54.0 | 6.1 |
| 100 mm–311° F./60 min | * | 7.5 |
| 150 mm–311° F./60 min | * | 27.0 |

*Complete sag, >75 mm

The system of Table 3 was also used to prepare a mold for polyurethane foam work. A rigid polyurethane foam deer head used in taxidermy work, was coated with a mold release agent. A thin coat of the polyurea elastomer was then applied to completely encapsulate the foam. More spray polyurea elastomer was applied in combination with the chopped glass, to build in strength, to a total thickness of approximately ½" to ¾". After spraying, the mold was then cut lengthwise to give two halves and the foam removed. The inside of the mold retained the same surface as that of the polyurethane foam deer head. This mold was very similar to one prepared from fiberglass resins and fiberglass except that it was prepared in a fraction of the time. The mold was then coated with mold release on the inside, clamped together and used to prepare a rigid polyurethane foam deer head.

All spray work has been done using a Gusmer HV proportioner with a model GX-7 spray gun. For the chopped glass work, a Venus R84 glass roving cutter was used. The systems were sprayed using a block temperature of 160° F. on the A-component side and 150° F. on the B-component side with a hose temperature of 160° F. The system output was 17.5 lbs/min to 22.5 lbs/min with a line pressure of 2500 to 2800 psig on the A-component side and 2000 to 2500 psig on the B-component side. The systems were mixed 1 to 1 by volume in this spray equipment.

GLOSSARY

| | |
| --- | --- |
| ISONATE ® 143L | From Dow Chemical Co. modified pure MDI |
| THANOL ® SF-5505 | 5000 MW polyoxyalkylene triol from ARCO Chemical Company. |
| JEFFAMINE ® D-4000 | 4000 MW amine terminated polyoxyalkylene diol. |
| JEFFAMINE ® T-3000 | 3000 MW amine terminated polyoxyalkylene triol. |
| JEFFAMINE ® D-2000 | 2000 MW amine terminated polyoxyalkylene diol. |
| ETHACURE ® 300 | di(methylthio) - toluenediamine from Ethyl Corporation. |
| JEFFAMINE ® T-5000 | 5000 mw amine terminated polyoxyalkylene triol from Texaco Chemical Company. |
| DETDA | diethyltoluenediamine from Ethyl Corporation. |
| N,N'-bis(t-butyl)-ethylenediamine | From Virginia Chemicals |
| Glass Roving | From Owens Corning Fiberglas. |

I claim:

1. A method for making a spray elastomer comprising spraying together two reactive streams and dispensing a filler material into the spray pattern wherein one of the two reactive streams comprises an aromatic polyisocyanate and the other reactive stream comprises amine terminated polyethers of greater than 1500 molecular weight, prepared by the reductive amination of polyols having greater than 50% of their active hydrogens in the form of amine hydrogens, and a chain extender.

2. A method as in claim 1 wherein the filler material is chopped glass.

3. A method as in claim 1 wherein the amine terminated polyether has a functionality ranging from about two to about three.

4. A method for making a spray elastomer comprising spraying together two reactive streams and dispensing a filler material comprising chopped glass into the spray pattern wherein one of the two reactive streams comprising an aromatic polyisocyanate and the other reactive stream comprises amine terminated polyethers greater than 1500 molecular weight, prepared by the reductive amination of polyols having greater than 50% of their active hydrogens in the form of amine hydrogens, and a chain extender.

* * * * *